US008755658B2

(12) United States Patent
Proulx

(10) Patent No.: US 8,755,658 B2
(45) Date of Patent: Jun. 17, 2014

(54) ARCHIMEDEAN-LATTICE MICROSTRUCTURED OPTICAL FIBER

(75) Inventor: Antoine Proulx, Québec (CA)

(73) Assignee: Institut National d'Optique, Quebec, Quebec (CA)

( * ) Notice: Subject to any disclaimer, the term of this patent is extended or adjusted under 35 U.S.C. 154(b) by 821 days.

(21) Appl. No.: 11/707,599

(22) Filed: Feb. 15, 2007

(65) Prior Publication Data

US 2008/0199135 A1 Aug. 21, 2008

(51) Int. Cl.
*G02B 6/032* (2006.01)

(52) U.S. Cl.
USPC ................................. 385/125; 65/385

(58) Field of Classification Search
CPC .................... G02B 6/02323; G02B 6/02347
USPC ............... 385/125, 142, 123; 264/1.24, 1.28; 65/385
See application file for complete search history.

(56) References Cited

U.S. PATENT DOCUMENTS

| | | | |
|---|---|---|---|
| 4,815,079 A | | 3/1989 | Snitzer et al. |
| 5,332,681 A * | | 7/1994 | Tonucci et al. ............... 438/493 |
| 5,526,449 A * | | 6/1996 | Meade et al. .................... 385/14 |
| 5,802,236 A * | | 9/1998 | DiGiovanni et al. ......... 385/127 |
| 5,907,652 A | | 5/1999 | DiGiovanni et al. |
| 6,097,870 A | | 8/2000 | Ranka et al. |
| 6,243,522 B1 * | | 6/2001 | Allan et al. ................... 385/123 |
| 6,301,420 B1 * | | 10/2001 | Greenaway et al. .......... 385/126 |
| 6,334,019 B1 | | 12/2001 | Birks et al. |
| 6,404,966 B1 * | | 6/2002 | Kawanishi et al. ............ 385/125 |
| 6,418,258 B1 * | | 7/2002 | Wang ........................... 385/125 |
| 6,539,155 B1 * | | 3/2003 | Broeng et al. ................. 385/125 |
| 6,574,383 B1 * | | 6/2003 | Erchak et al. .................... 385/15 |
| 6,603,912 B2 * | | 8/2003 | Birks et al. .................... 385/125 |
| 6,608,955 B2 * | | 8/2003 | Fukuda et al. ................. 385/125 |
| 6,788,865 B2 * | | 9/2004 | Kawanishi et al. ........... 385/125 |
| 6,845,204 B1 * | | 1/2005 | Broeng et al. ................. 385/126 |

(Continued)

FOREIGN PATENT DOCUMENTS

| | | | | |
|---|---|---|---|---|
| JP | 2002277666 A | * | 9/2002 | ............... G02B 6/17 |
| JP | 2003227941 A | * | 8/2003 | ............... G02B 6/00 |

(Continued)

OTHER PUBLICATIONS

Proulx et al., "Design, fabrication, and characterization of holey fibers," 2003. Proc. SPIE 4833, pp. 696-704.*

(Continued)

*Primary Examiner* — Peter Radkowski
(74) *Attorney, Agent, or Firm* — Merchant & Gould P.C.

(57) ABSTRACT

A microstructured optical fiber exhibiting enhanced circularity of the guided light mode is provided. The microstructured optical fiber includes a light-guiding core and a primary cladding surrounding the core wherein the primary cladding has a plurality of holes arranged in hexagonal unit cells defining an Archimedean-like lattice. Preferably, the core is defined by a break in a center of the Archimedean-like lattice, the break being characterised by an absence of at least one of the unit cells. Also preferably, each of the unit cells has seven holes arranged in a centred hexagon. A method of making the microstructured optical fiber is also provided. The method includes fabricating a fiber preform by stacking a plurality of canes around a rod, each cane having a number of holes arranged in a unit cell defining an Archimedean-like lattice, and drawing said fiber preform into the microstructured optical fiber.

25 Claims, 15 Drawing Sheets

(56) References Cited

U.S. PATENT DOCUMENTS

| | | | |
|---|---|---|---|
| 6,847,771 B2 | 1/2005 | Fajardo et al. | |
| 6,888,992 B2 | 5/2005 | Russel et al. | |
| 7,228,041 B2 * | 6/2007 | Kim et al. | 385/125 |
| 7,348,603 B2 * | 3/2008 | Erchak et al. | 257/98 |
| 7,359,603 B2 * | 4/2008 | Large et al. | 385/125 |
| 2001/0026667 A1 * | 10/2001 | Kawanishi et al. | 385/125 |
| 2001/0029756 A1 * | 10/2001 | Paek et al. | 65/395 |
| 2002/0122644 A1 * | 9/2002 | Birks et al. | 385/125 |
| 2002/0126370 A1 * | 9/2002 | Broderick et al. | 359/332 |
| 2002/0131741 A1 * | 9/2002 | Bayart et al. | 385/125 |
| 2002/0131742 A1 * | 9/2002 | Bayart et al. | 385/125 |
| 2002/0181911 A1 * | 12/2002 | Wadsworth et al. | 385/125 |
| 2003/0059185 A1 * | 3/2003 | Russell et al. | 385/125 |
| 2003/0136154 A1 * | 7/2003 | Tajima et al. | 65/393 |
| 2003/0180018 A1 * | 9/2003 | Hasegawa | 385/125 |
| 2004/0091224 A1 * | 5/2004 | Baumberg et al. | 385/129 |
| 2004/0096173 A1 * | 5/2004 | Fekety et al. | 385/125 |
| 2004/0105640 A1 * | 6/2004 | Hasegawa | 385/125 |
| 2004/0105641 A1 * | 6/2004 | Russell et al. | 385/125 |
| 2004/0151450 A1 | 8/2004 | Wadsworth et al. | |
| 2004/0158381 A1 * | 8/2004 | Strelioff et al. | 701/50 |
| 2004/0175084 A1 * | 9/2004 | Broeng et al. | 385/125 |
| 2004/0222480 A1 * | 11/2004 | Weisbuch et al. | 257/433 |
| 2004/0258381 A1 * | 12/2004 | Borrelli et al. | 385/125 |
| 2005/0034484 A1 * | 2/2005 | Large et al. | 65/392 |
| 2005/0147366 A1 * | 7/2005 | Large et al. | 385/123 |
| 2005/0180710 A1 * | 8/2005 | Oh et al. | 385/125 |
| 2005/0276556 A1 | 12/2005 | Williams et al. | |
| 2005/0286847 A1 * | 12/2005 | Arimondi et al. | 385/123 |
| 2006/0204865 A1 * | 9/2006 | Erchak et al. | 430/7 |
| 2008/0112678 A1 * | 5/2008 | Kim et al. | 385/125 |
| 2009/0212265 A1 * | 8/2009 | Steinhardt et al. | 252/501.1 |

FOREIGN PATENT DOCUMENTS

| | | | |
|---|---|---|---|
| WO | WO 2004/019092 | 3/2004 | |
| WO | WO 2004019092 A1 * | 3/2004 | G02B 6/16 |
| WO | WO 2004/057394 A1 | 7/2004 | |

OTHER PUBLICATIONS

Bourliaguet et al., "Microstructured fiber splicing," 2003. Opt. Express 11, pp. 3412-3417.*

Proulx et al., "Low-loss splicing of microstructured fibers with conventional electric-arc splicers," 2004. Proc. SPIE 5577, 519-526.*

Wang, Yiquan, "Coupled-resonator optical waveguides in photonic crystals with Archimedean-like tilings," Europhys. Lett., 74 (2), pp. 261{267 (2006).*

David et al. "Wide angularly isotropic photonic bandgaps obtained from two-dimensional photonic crystals with Archimedean-like tilings;" Optics Letters, vol. 25, Iss. 14, pp. 1001-1003 (2000).*

Rattier et al. "Omnidirectional and compact guided light extraction from Archimedean photonic lattices", Appl. Phys. Lett. 83 1283-5 (2003).*

Wang, Yiquan, "Coupled-resonator optical waveguides in photonic crystals with Archimedean-like tilings," Europhys. Lett., 74(2), pp. 261{267 (2006).*

Fini et al. "High-Efficiency Nitride-Based Solid-State Lighting" Final Technical Progress Report, for Award Period Oct. 1, 2001-Apr. 30, 2005, DoE Award #DE-FC26-01NT41203, High-Efficiency Nitride-Based Solid-State Lighting, pp. 42-43.*

David et al. "Isotropic Photonic Structures: Archimedean-Like Tilings and Quasi-Crystals," IEEE Journal of Quantum Electronics, vol. 37, No. 11, Nov. 2001, pp. 1427-1434.*

M. Rattier, H. Benisty, E. Schwoob, C. Weisbuch, T. F. Krauss, C. J. M. Smithd, R. Houdre and U. Oesterle "Omnidirectional and compact guided light extraction from Archimedean photonic lattices" Applied Physics Letters—vol. 83, No. 7, Aug. 18, 2003, pp. 1283-1285.

Aurélien David, Tetsuo Fujii, Elison Matioli, Rajat Sharma, Shuji Nakamura, Steven P. Denbaars, Claude Weisbuchc and Henri Benisty "GaN light-emitting diodes with Archimedean lattice photonic crystals" Applied Physics Letters 88, 073510 (2006).

J. Limpert, A. Liem, M. Reich, T. Schreiber, S. Nolte, H. Zellmer, A. Tünnermannj. Broeng, A. Petersson and C. Jakobsen "Low-nonlinearity single-transverse-mode ytterbium-doped photonic crystal fiber amplifier" Optics Express 1313—vol. 12, No. 7, Apr. 5, 2004, pp. 1313-1319.

J. Limpert, N. Deguil-Robin, I. Manek-Hönninger, F. Salin, F. Röser, A. Liem, T. Schreiber, S. Nolte, H. Zellmer, A. Tünnermann, J. Broeng, A. Petersson and C. Jakobsen "High-power rod-type photonic crystal fiber laser" Optics Express 1055—vol. 13, No. 4, Feb. 21, 2005, pp. 1055-1058.

D. Mogilevtsev, T. A. Birks, and P. St. J. Russell "Group-velocity dispersion in photonic crystal fibers" Optics Letters 1663—vol. 23, No. 21, Nov. 1, 1998, pp. 1662-1664.

Jung-Sheng Chiang and Tzong-Lin Wu "Analysis of propagation characteristics for an octagonal photonic crystal fiber (O-PCF)" Optics Communications 258 (2006) 170-176.

P. Glas, D. Fischer. G. Steinmeyer, A. Husakou, J. Herrmann, R. Iliew, N.B. Skibina, V.I. Beloglasov, Y.S. Skibina "Supercontinuum generation in a two-dimensional photonic kagome crystal" Applied Physics B 81—Lasers and Optics, 209-217 (2005).

F. Luan, A. K. George, T. D. Hedley, G. J. Pearce, D. M. Bird, J. C. Knight, and P. St. J. Russell "All-solid photonic bandgap fiber" Optics Letters—vol. 29, No. 20, Oct. 15, 2004, pp. 2369-2371.

F. Couny, F. Benabid, and P. S. Light "Large-pitch kagome-structured hollow-core photonic crystal fiber" Optics Letters 3574—vol. 31, No. 24, Dec. 15, 2006, pp. 3574-3576.

David et al., *Isotropic Photonic Structures: Archimedean-Like Tilings and Quasi-Crystals*, IBEE Journal of Quantum Electronics, vol. 37, No. 11, Nov. 2001.

* cited by examiner

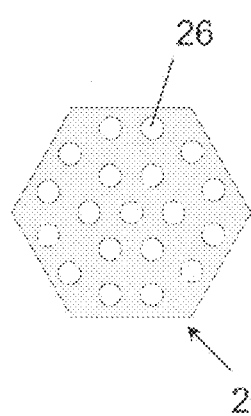
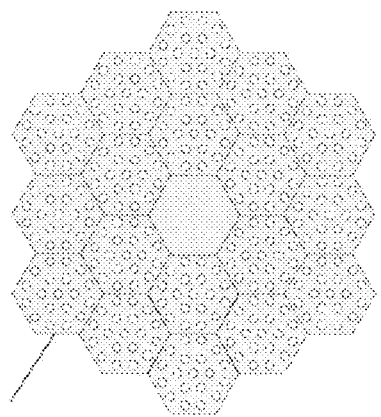
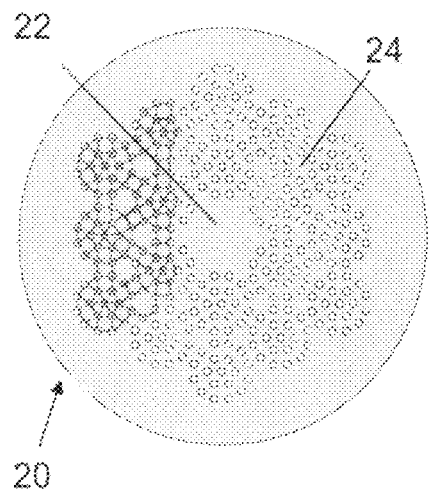
FIG. 9A     FIG. 9B     FIG. 9C
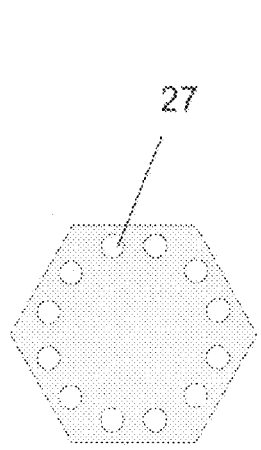
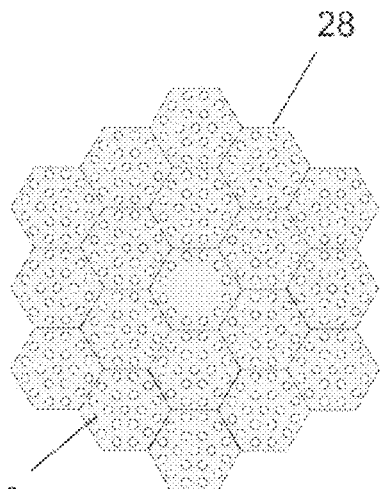
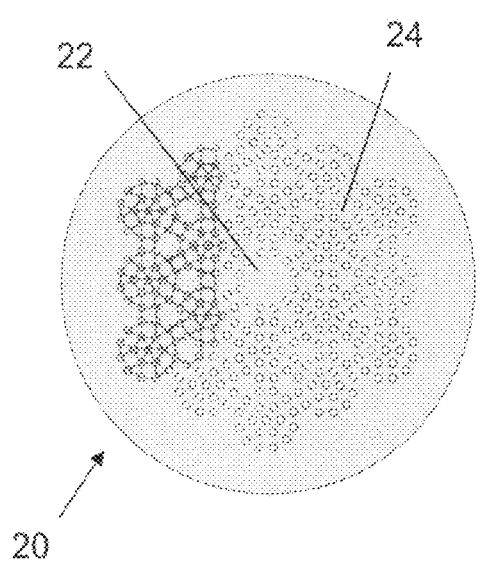
FIG. 10A     FIG. 10B     FIG. 10C

ARCHIMEDEAN-LATTICE MICROSTRUCTURED OPTICAL FIBER

FIELD OF THE INVENTION

The present invention relates to the field of optical fibers and more particularly concerns a microstructured optical fiber having holes arranged in an Archimedean-like lattice surrounding a light-guiding core.

BACKGROUND OF THE INVENTION

Optical fibers are used in a variety of applications such as telecommunications, illumination, fiber lasers, laser machining and welding, sensors, medical diagnostics and surgery.

A typical standard optical fiber is made of transparent material. It is uniform along its length, and has a cross-section of varying refractive index. For example, the transparent material in the central region, i.e. the core, may have a higher refractive index than the transparent material in the outer region, i.e. the cladding. Light is confined in or near the core and guided along the length of the optical fiber by the principle of total internal reflection at the interface between the core and cladding.

A microstructured optical fiber (MOF), also known as a holey fiber, a photonic crystal fiber or a photonic bandgap fiber, differs from a standard waveguide fiber in that it has a cross-section microstructured from two or more materials. A microstructured fiber has a cladding running the length of the fiber that is microstructured from two or more materials most commonly arranged periodically over much of the cross-section. For example, a microstructured optical fiber may have a cladding made of a transparent material in which a periodic array of holes extends longitudinally, the holes being arranged periodically over much of the cladding cross-section and filled with material which has a lower refractive index than the transparent material of the rest of the cladding, and a core of transparent material consisting of a break in the periodic array of the cladding. MOFs can guide light according to one of two mechanisms. In a microstructured optical fiber with a solid core, or a core with a higher average refractive index than the microstructured cladding, light may be guided along the core by the same index-guiding mechanism of total internal reflection as in standard optical fibers or by a mechanism based on photonic-band-gap effects. With total-internal-reflection guidance, MOFs can have a much higher effective-index contrast between core and cladding, and therefore can have much stronger confinement for specialized applications. With photonic-band-gap guidance, light is confined by a photonic bandgap created by the microstructured cladding. A properly designed bandgap can confine light in a hollow core or a core of lower refractive index than the cladding.

In general, an optical fiber may be multi-mode or single-mode. A multi-mode fiber allows for more than one mode of the light wave, each mode travelling at a different phase velocity, to be confined to the core and guided along the fiber. A single-mode fiber supports only one transverse spatial mode at a frequency of interest. Given a sufficiently small core or a sufficiently small numerical aperture, it is possible to confine a single mode, the fundamental mode, to the core. Single-mode fibers are preferred for many applications because the problem of intermodal dispersion encountered by multi-mode fibers is avoided, and the intensity distribution of the light wave emerging from the fiber is unchanged regardless of launch conditions and any disturbances of the fiber.

For some applications, it is advantageous to carry as much optical power as possible. However, if the light intensity within the fiber exceeds a certain threshold, the material from which the fiber is made will suffer irreversible damage. Increasing the diameter size of the core of the fiber reduces the intensity of the light for a given power and allows a greater power to be carried. Using a larger core fiber also helps to reduce the non-linear effects that appear at high power.

For example, in the field of high-power lasers and amplifiers, the onset of adverse non-linear effects can severely degrade the spectral content and limit the power output of the laser source. Using a single-mode large-mode-area active fiber as the amplifying medium is a relatively easy solution to the problem of non-linear effects which can be detrimental to the operation of the laser.

Most microstructured optical fibers that are reported in the prior art literature—for example, in U.S. Pat. No. 6,334,019 (Birks et al.), U.S. Pat. No. 6,603,912 (Birks et al.), and U.S. Pat. No. 6,888,992 (Russell et al.)—consist of a cladding which has embedded along its length a substantially periodic array of holes and a core defined by the absence of at least one hole in the array, essentially, a triangular lattice of holes surrounding a central defect constituted by the absence of at least one of the holes in the lattice structure. One particular implementation of this design is the case where a seven-missing-holes defect defining a core is surrounded by a triangular lattice of holes defining a microstructured cladding. This is for example reported in Limpert et al., "Low non-linearity single-transverse-mode ytterbium-doped photonic crystal fiber amplifier", Opt. Express 12(7), 1313 (2004) and in J. Limpert et al., "High-power rod-type photonic crystal fiber laser", Opt. Express 13(4), 1055 (2005)]. By using such designs, a single-transverse-mode large-mode-area fiber that allows the transportation of high optical power while minimizing the non-linearity can be devised. Core diameters of 45 µm or greater may be achieved with such designs. Such large-mode-area fiber designs are particularly important in the field of high power lasers, where the core of the fiber is doped with active ions permitting a laser effect. However one drawback of the proposed triangular lattice structure of the cladding for the microstructured optical fibers is the quality of the mode profile of the light beam, more particularly the non-circular form of the guided mode profile, which stems from a central core having a cross-section which is more hexagonal than circular. Such sub-optimal beam quality can be detrimental for applications, such as precision laser surgery or micromachining, where light beam quality, i.e. a circular mode profile, is critical.

There is therefore a need for a microstructured optical fiber that enhances the circularity of the profile of the guided light mode.

SUMMARY OF THE INVENTION

In accordance with one aspect of the present invention, there is provided a microstructured optical fiber which includes a light-guiding core and a primary cladding surrounding the core. The primary cladding has a plurality of holes arranged in hexagonal unit cells and defining an Archimedean-like lattice.

Preferably, the core is defined by a break in a center of the Archimedean-like lattice, the break being characterized by an absence of at least one of the unit cells.

Also preferably, the Archimedean-like lattice comprises at least one complete ring of the unit cells arranged around the core.

In one preferred embodiment of the microstructured optical fiber, each unit cell has seven holes arranged in a centred hexagon. Preferably, the Archimedean-like lattice includes at least one complete ring of unit cells arranged circumferentially around the core and may further optionally include at least one outer incomplete ring of unit cells.

In accordance with another aspect of the present invention, there is also provided a method for making a microstructured optical fiber which includes a step of fabricating a fiber preform, this fabricating including the sub-steps of:
(a) providing a rod for defining a light-guiding core;
(b) fabricating a plurality of canes, each cane having a substantially hexagonal cross-section and having a number of holes therethrough arranged in a unit cell defining an Archimedean-like lattice; and
(c) stacking the plurality of canes concentrically around the rod.

The method preferably further includes a step of drawing the fiber preform into the desired microstructured optical fiber Other features and advantages of the present invention will be better understood upon reading of preferred embodiments thereof with reference to the appended drawings.

BRIEF DESCRIPTION OF THE DRAWINGS

FIG. 9A is a schematic representation of an A19 unit cell; FIG. 9B is a schematic representation showing the tiling of the hexagonal A19 unit cells of FIG. 9A; and FIG. 9C is a schematic representation of an Archimedean-like lattice of holes defined by type A19 unit cells, showing the resulting fiber profile.

FIG. 10A is a schematic representation of a center cell defining a circularized core of an Archimedean-like microstructured optical fiber according to one embodiment of the invention; FIG. 10B is a schematic representation of an Archimedean-like lattice of holes defined by type A19 unit cells and a circularized core, showing the tiling of the hexagonal A19 unit cells around the center cell; and FIG. 10C is a schematic representation of an Archimedean-like lattice of holes defined by type A19 unit cells and a circularized core, showing the resulting fiber profile.

DESCRIPTION OF PREFERRED EMBODIMENTS OF THE INVENTION

The aspects of the present invention will be described more fully hereinafter with reference to the accompanying drawings FIGS. 1 to 17 in which like numerals refer to like elements throughout.

Microstructured Optical Fiber

Figure 1A:
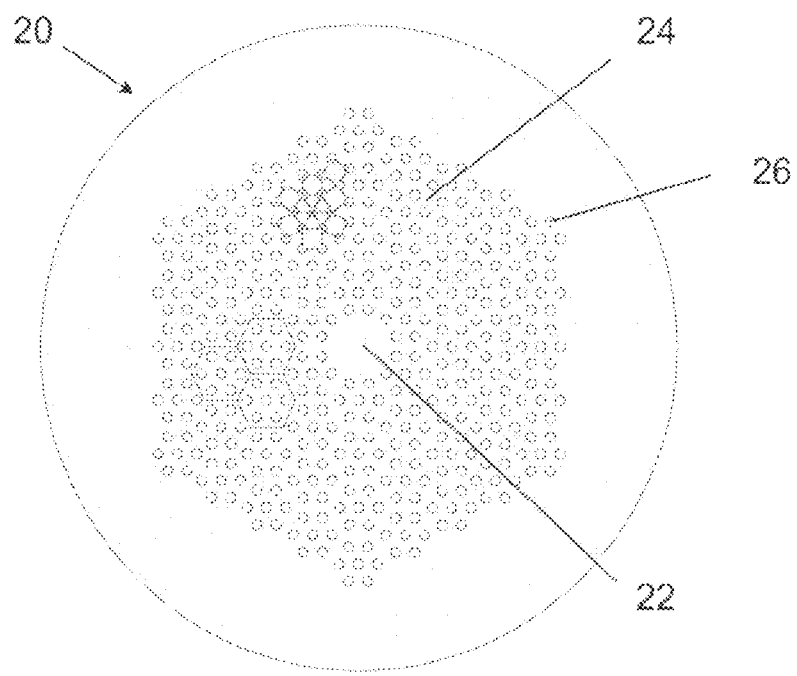
FIG. 1A is a schematic representation of a cross-section of a seven-missing-holes Archimedean-like-lattice microstructured optical fiber according to a preferred embodiment of the invention.

In accordance with one aspect of the present invention, there is generally provided a microstructured optical fiber (20) which includes a primary cladding (24) surrounding a light-guiding core (22). The primary cladding (24) has a plurality of holes (26) arranged in hexagonal unit cells (28) and defining an Archimedean-like lattice. The light-guiding core (22) may be defined by a break in the center of the Archimedean-like lattice, the break being characterised by an absence of at least one of the unit cells. Preferably, the MOF (20) includes an overcladding which surrounds the primary cladding (24). The overcladding, in contrast to the primary cladding, often does not have a hole microstructure and may be made of any suitable material, for example substantially solid silica. In general, as with most fibers, the MOF may also have a protective outer coating, for example a coating of acrylate. FIG. 1A shows a microstructured optical fiber (20) according to a preferred embodiment of the invention.

An Archimedean two-dimensional (2-D) lattice or tiling is an isogonal edge-to-edge plane tiling by regular polygons, in which every vertex and edge of a tile is a vertex and edge of the tiling. In the case where all of the vertices do not have the same immediate environment, for example in the case of central vertices of the lattice which do not have the same environment as the other vertices, the lattice is best referred to as Archimedean-like or semi-regular. Archimedean-like lattices, or tilings, have periodic structures similar to conventional 2-D photonic crystals, but they possess a higher order of local rotational symmetry than the traditional Bravais lattice—the Bravais lattices having the highest order of rotational symmetry (6) are the triangular and honeycomb lattices [see David et al., "Isotropic Photonic structured: Archimedean-like tilings and quasi-crystals," IEEE J. Quantum Electron. 37, 1427 (2001)]. The periodic structure of Archimedean and Archimedean-like lattices/tilings can mimic some properties of quasi-crystalline structures. Quasi-crystalline structures are so-named because the pattern of defects is only quasi-periodic, locally the defects are arranged in a fixed regular pattern but this pattern is not periodic globally throughout the entire structure.

In general, a lattice may be described in terms of its unit cell, the simplest repeating unit which when tiled in 2-D or 3-D space yields the lattice. Each unit cell is defined in terms of its lattice points.

Figures 12A, 12B, 12C:
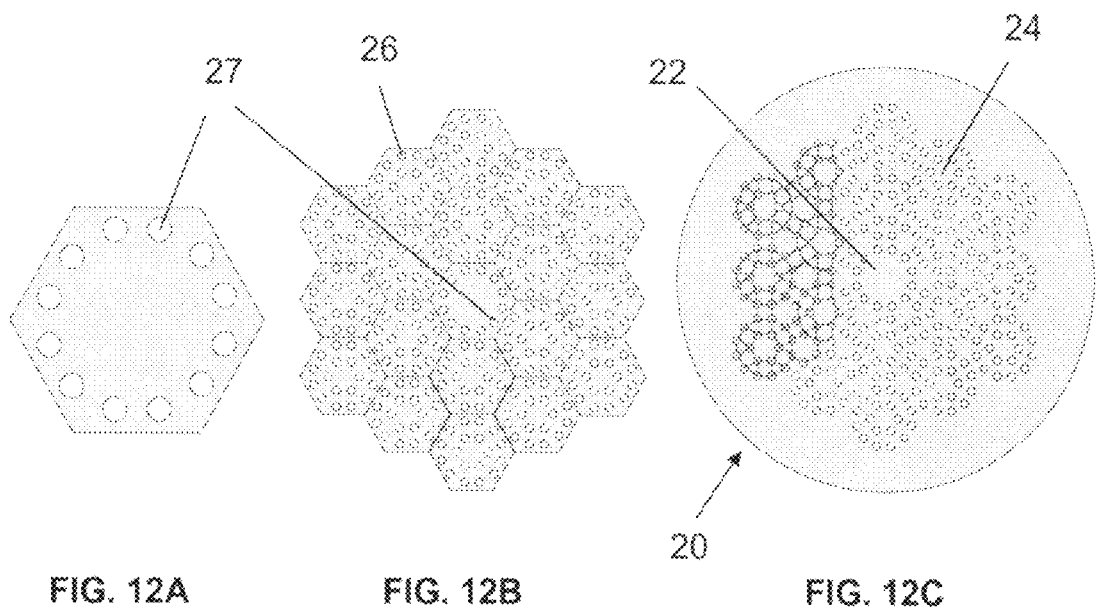
FIG. 12A is a schematic representation of a center cell defining a circularized core of an Archimedean-like microstructured optical fiber, according to one embodiment of the invention.
FIG. 12B is a schematic representation of an Archimedean-like lattice of holes defined by type A18 unit cells and a circularized core, showing the tiling of the hexagonal A18 unit cells around the center cell.
FIG. 12C is a schematic representation of an Archimedean-like lattice of holes defined by type A18 unit cells and a circularized core, showing the resulting fiber profile.

The light-guiding core (22) of the MOF (20) may be substantially solid across its entire cross-section. Even if the core (22) is substantially solid, it may have holes (27) along its circumferential perimeter as shown in FIGS. 10C and 12C or it may also have one or more holes near the center. It may be made of a substantially transparent material, doped or undoped. Alternatively, the core (22) may be hollow consisting of vacuum or air, as in the case of photonic-bandgap-guidance in an air-guiding photonic-bandgap MOF.

Figures 7A, 7B:
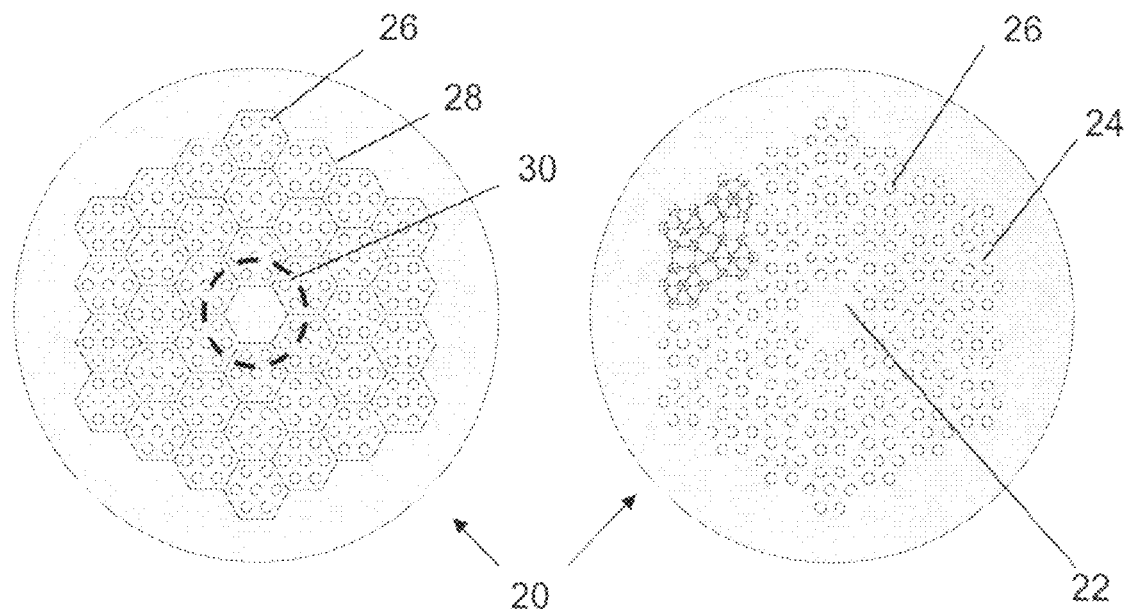
FIGS. 7A and 7B are schematic representations of the lattice structure and the resulting fiber profile, respectively, for an Archimedean-like lattice of holes defined by type A7 unit cells.
Figures 8A, 8B:
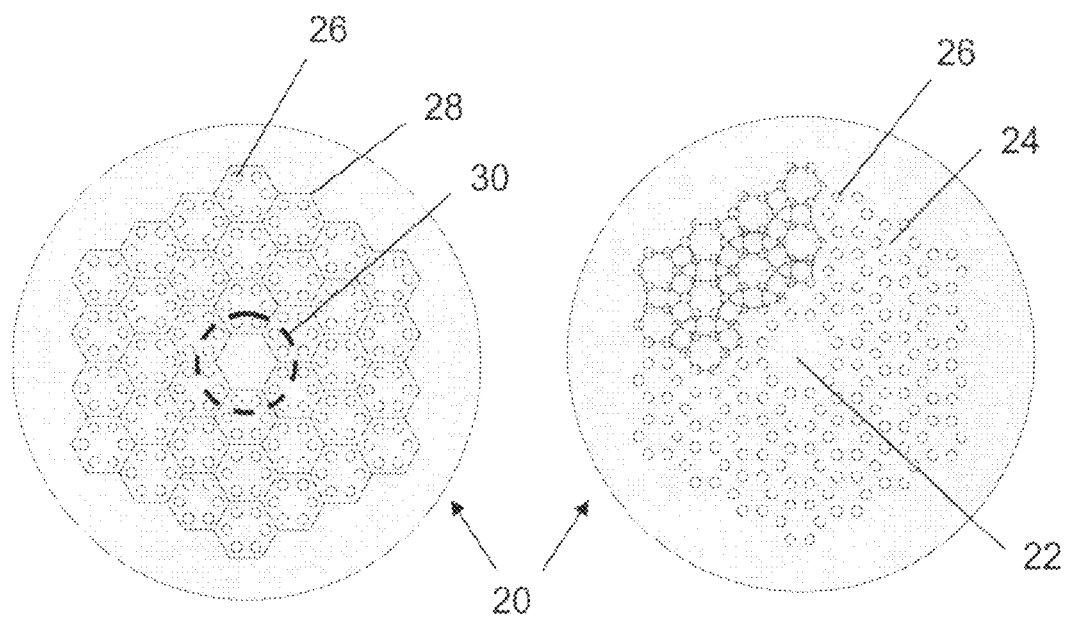
FIGS. 8A and 8B are schematic representations of the lattice structure and the resulting fiber profile, respectively, for a true Archimedean lattice of holes defined by type A6 unit cells.
Figures 11A, 11B, 11C:
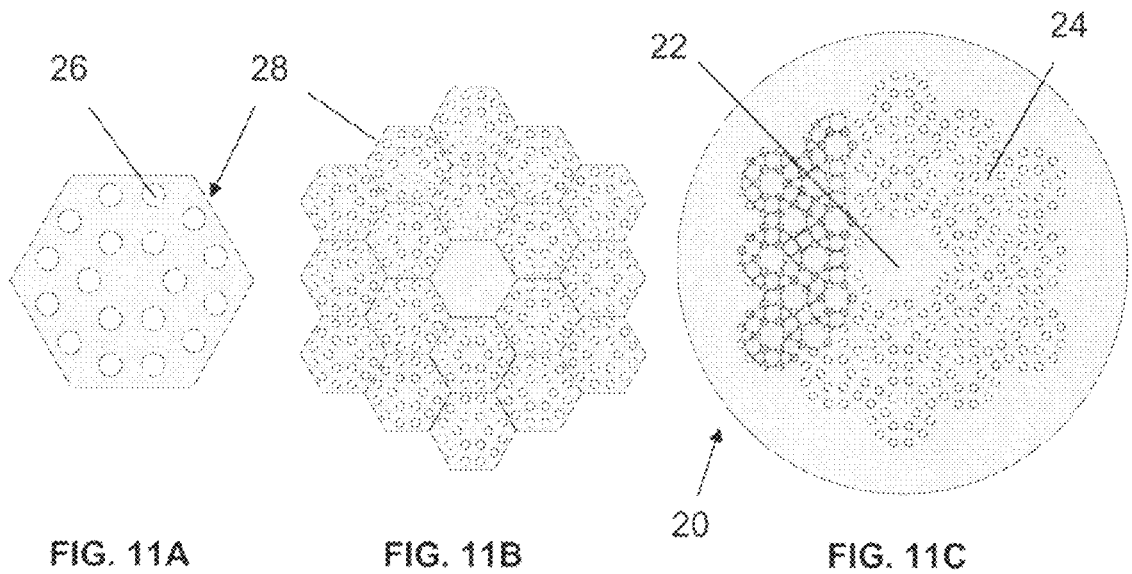
FIG. 11A is a schematic representation of an A18 unit cell.
FIG. 11B is a schematic representation of an Archimedean-like lattice of holes defined by type A18 unit cells, showing the tiling of the hexagonal A18 unit cells.
FIG. 11C is a schematic representation of an Archimedean-like lattice of holes defined by type A18 unit cells, showing the resulting fiber profile.

The primary cladding (24) of the MOF (20) surrounding the core (22) comprises a substantially transparent material in which a number of holes (26) extends longitudinally. As mentioned above, the holes (26) are arranged in hexagonal unit cells (28) and define an Archimedean-like lattice over much of the cross-section of the primary cladding (24). Although the holes (26) are preferably substantially circular in shape and of practically the same diameter, each hole (26) need not be perfectly circular nor have the exact same diameter as the other holes (26). Preferably, the Archimedean-like lattice has at least one complete ring (30) of the unit cells (28) arranged circumferentially around the core, as shown in FIGS. 7A and 8A. The Archimedean-like lattice may also have one or more incomplete outer rings (32) of unit cells (28) arranged circumferentially around one or more inner complete rings (30). For example, in one possible implementation of the design shown in FIG. 16A, the fourth ring of unit cells is incomplete—the six unit cells at the corners are missing.

Figures 17A, 17B:
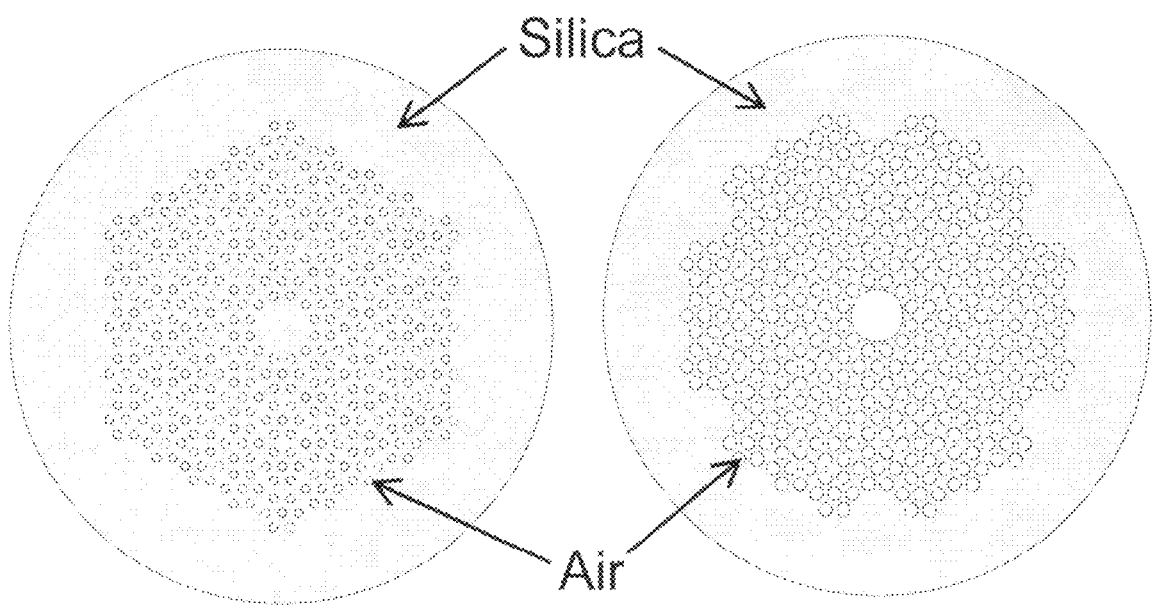
FIG. 17A is a schematic representation of a cross-section of an Archimedean-like microstructured fiber with a solid core.
FIG. 17B is a schematic representation of a cross-section of an Archimedean-like microstructured fiber with a core made of the same low-refractive-index material of the holes.

The transparent material of the primary cladding (24) may consist of a doped or undoped polymer (e.g. polymethylmethacrylate (PMMA), etc.) or glass (e.g. silica, chalcogenide glass, soft glass, etc.). It may be different or the same as that of the core (22). The holes (26) may be empty (vacuum) or filled with a transparent material that has a refractive index which is different from the refractive index of the material of the primary cladding (24). Moreover, all of the holes (26) of the unit cell need not be filled with the same material; some of the holes (26) may be filled with one material while others are filled with a different material. The hole material may be a solid (e.g. a glass such as silica, polymer, etc.), liquid (e.g. water, dye solution, etc.) or gas (e.g. air, nitrogen, hydrogen, etc). In the case of a MOF with total-internal-reflection guidance, the holes may be filled with air, the primary cladding material may be silica, and the core material may also be silica, as shown in FIG. 17A. In the case of photonic bandgap guidance, the effective refractive index of the microstructured primary cladding is greater than that of the core. For a MOF with hollow-core photonic-bandgap guidance, the core and the holes may be filled with air whereas the primary cladding may be made of silica, for example, as shown in FIG. 17B. For an "all-solid" photonic bandgap fiber where the material of the primary cladding material and core is the same, the refractive index of the hole material is greater than that of the surrounding material, i.e. that of the primary cladding and core [see Luan et al., "All-solid photonic bandgap fiber", Optics Letters 29 (20), 2369 (2004)].

Figure 6A:
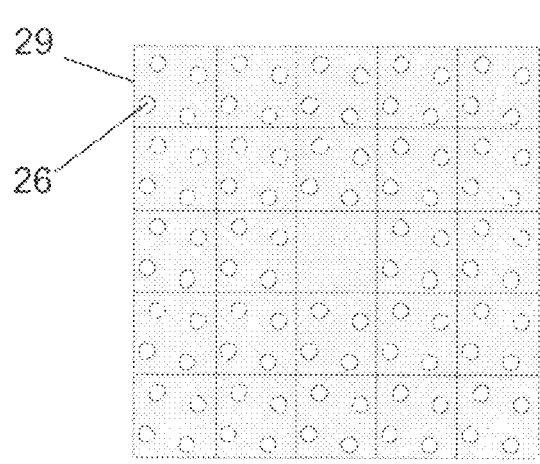
FIGS. 6A and 6B are schematic representations of the lattice structure and the resulting fiber profile, respectively, for a true Archimedean lattice of holes defined by type A4 unit cells.
Figure 6B:
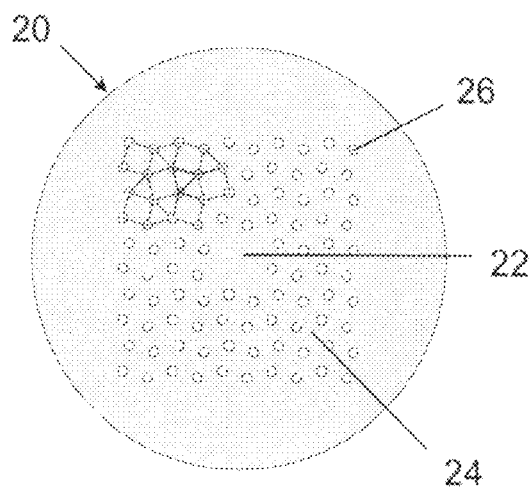

Referring to FIGS. 7A, 8A, 9A and B, 10B, 11A and B, and 12B, hexagonal unit cells (28) having preferably six, seven, eighteen, or nineteen holes (26) may for example be used to create the primary cladding (24) of the MOF (20). Such unit cells are referred to as A6, A7, A18, and A19, respectively, in keeping with Rattier et al., "Omnidirectional and compact guided light extraction from Archimedean photonic lattices", Applied Physics Letters 83, 1283 (2003)). The A6 unit cell (seen as part of the primary cladding in FIG. 8A) has six holes (26) arranged in a hexagon whereas the A7 unit cell (shown in FIG. 2 and as part of the cladding in FIG. 7A) has seven holes arranged in a centred hexagon. The A18 unit cell (FIG. 11A) has six holes (26) arranged in a hexagon surrounded by twelve additional holes (26) whereas the A19 unit cell (FIG. 9A) has seven holes (26) arranged in a centred hexagon surrounded by twelve additional holes (26). FIGS. 7A, 8A, 9B, 10B, 11B, and 12B illustrate the tiling of such hexagonal unit cells used to form the microstructured primary cladding, and FIGS. 7B, 8B, 9C, 10C, 11C, and 12C respectively show the resulting fiber profile. A MOF in which the holes of the primary cladding (24) are arranged in an A6- or A7-type unit cell (see FIGS. 8B and 7B) has a core (22) which is fairly circular whereas a MOF whose holes of the primary cladding (24) are arranged in a A18- or A19-type unit cell (see FIGS. 11C and 9C) has a core (22) which is less than circular. As shown in FIGS. 6A and 6B, square unit cells (29) having four holes (26) may be used to create an Archimedean lattice of holes (26) for a primary cladding (24) of a MOF (20), but the core (22) would have a strange shape not conducive to enhancing the circularity of the profile of the guided light mode thereby limiting the usefulness of the design. Therefore, a MOF whose primary cladding structure is based on the A6 or A7 unit cell provides a core which better enhances the circularity of the guided mode profile.

Figure 1B:
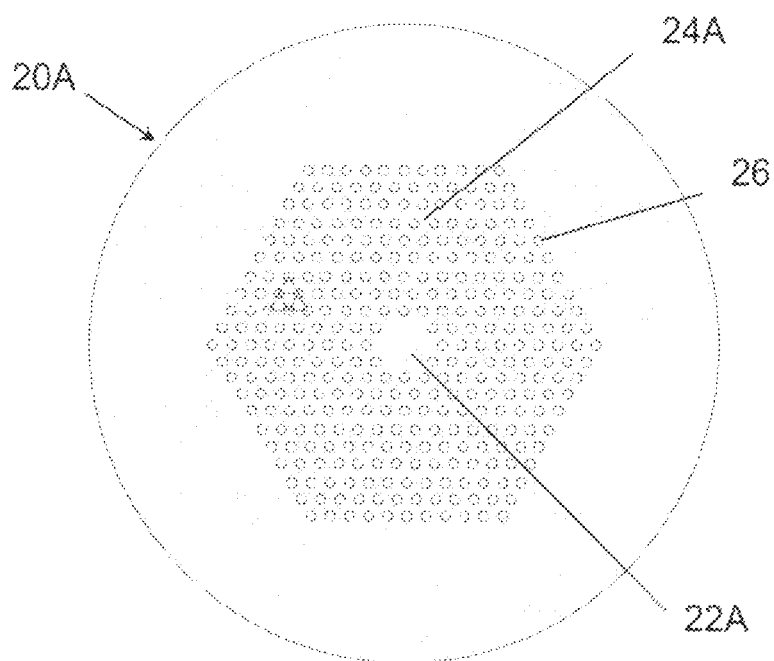
FIG. 1B [PRIOR ART] is a schematic representation of a cross-section of a seven-missing-holes conventional triangular-lattice microstructured optical fiber.

The novel cladding structure proposed here created using A7 unit cells is particularly well suited for a seven-missing-holes fiber design as the cladding structure is composed of hexagonal unit cells (28) comprising seven (7) holes (26) (FIG. 1A). FIG. 1B [PRIOR ART] provides a schematic representation of a conventional seven-missing-holes triangular lattice MOF (TL-MOF) whereas FIG. 1A shows a seven-missing-holes Archimedean-like lattice MOF (AL-MOF) in accordance with one embodiment of the present invention. By comparing FIGS. 1A and 1B, we see that the structure of the primary cladding of the AL-MOF (20) is substantially different from the structure of the cladding (24A) of the conventional TL-MOF (20A).

Figure 3A:
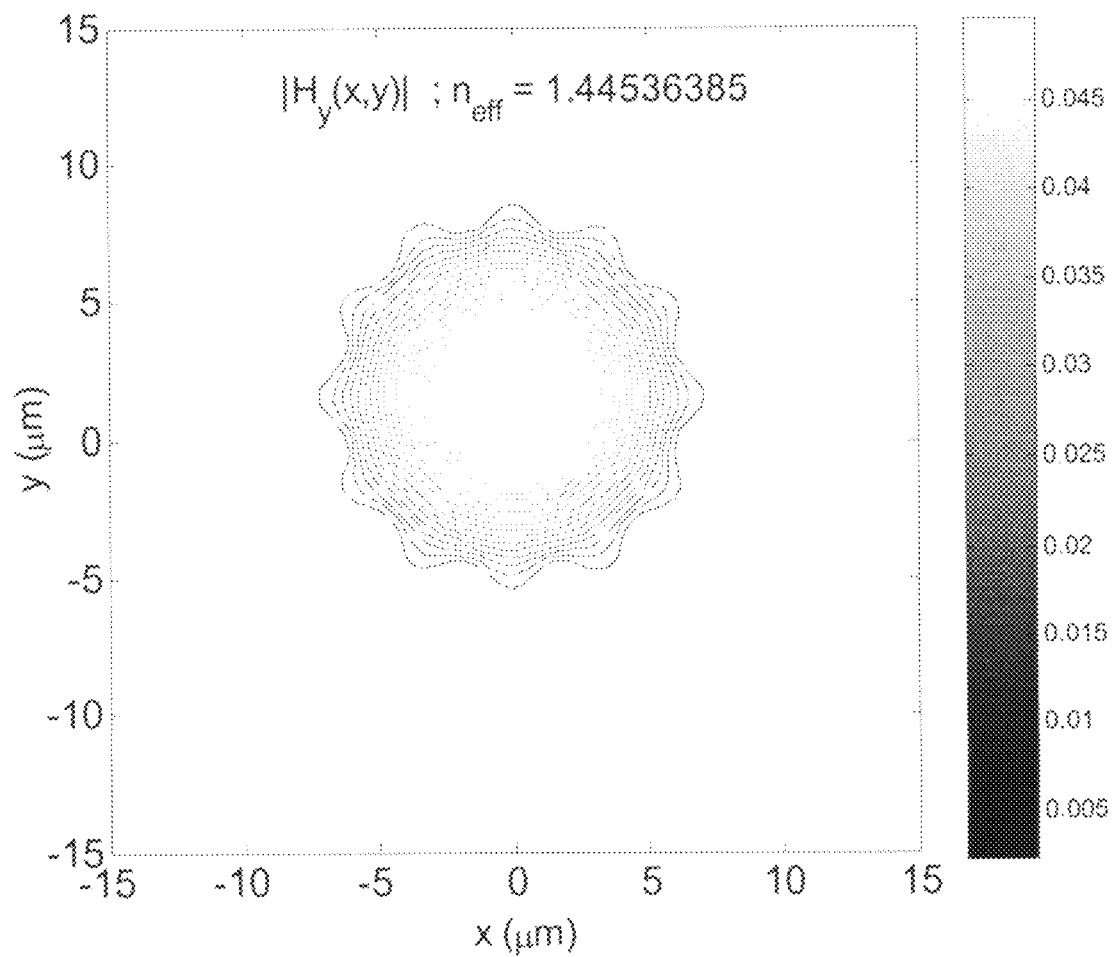
FIG. 3A is a graphical representation of the calculated near field profile of the fundamental guided mode in a microstructured optical fiber according to a preferred embodiment of the invention.
Figure 3B:
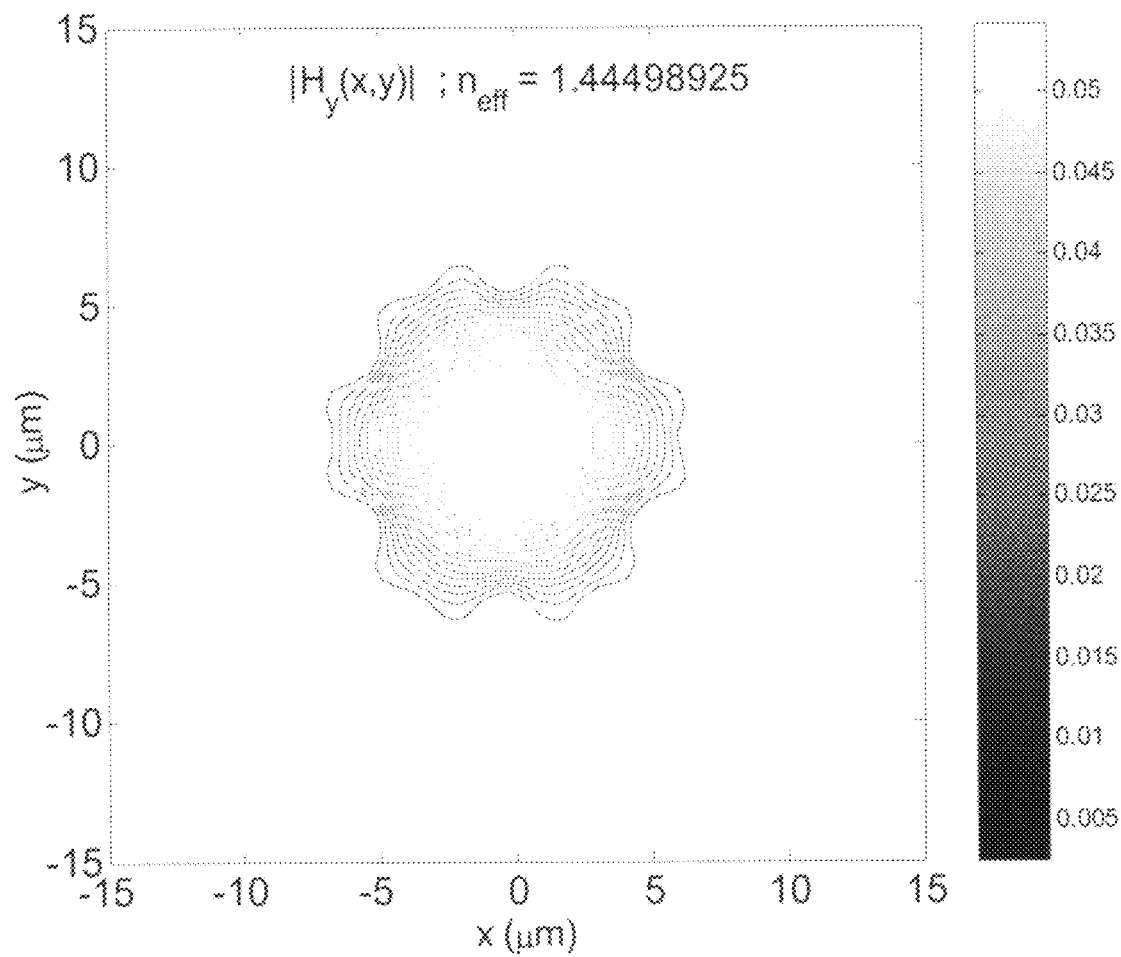
FIG. 3B [PRIOR ART] is a graphical representation of the calculated near field profile of the fundamental guided mode in a conventional microstructured optical fiber.

As it can be seen in FIGS. 1A and 1B, the AL-MOF (20) has a central core (22) that is much more circular than the core (22A) of the conventional seven-missing-holes TL-MOF (20A). To demonstrate this aspect more clearly, the near-field profile of the fundamental mode guided by the two structures, i.e. by the AL-MOF (20) and the TL-MOF (20A) (as calculated using a Finite-Difference Frequency-Domain method for Archimedean-like and Triangular-lattice claddings having a pitch of $\Lambda=4$ µm and hole diameter d=2 µm at a wavelength of 1.3 µm) is shown in FIGS. 3A and 3B. From FIGS. 3A and 3B, it is quite clear that the AL-MOF cladding leads to a much more circular mode profile. The circularity improvement was determined quantitatively from the following criteria:

$$C = \frac{MFD_{max} - MFD_{min}}{MFD_{average}},$$

where MFD refers to the Mode Field Diameter, defined as the root-mean-square (rms) width of the fundamental guided mode. A value of C=3% was obtained for the guided mode of the AL-MOF shown in FIG. 3A and a value of C=10% for that of the TL-MOF shown in FIG. 3B.

Figure 4A:
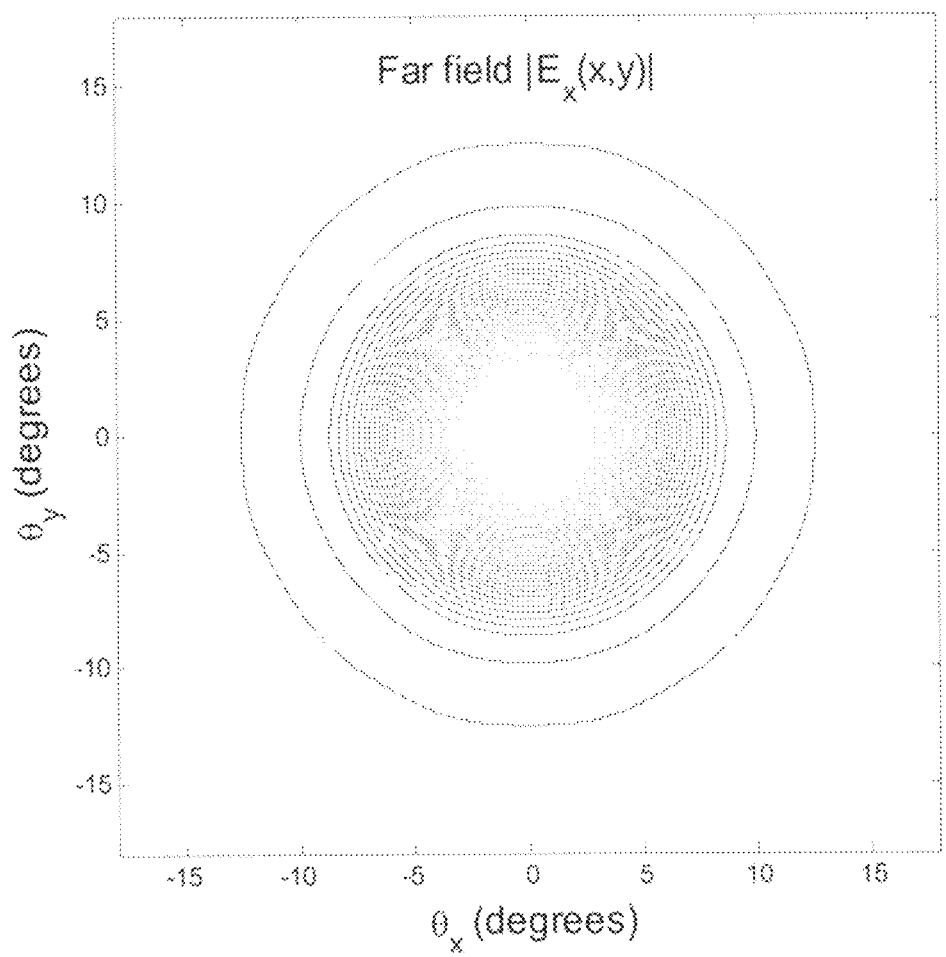
FIG. 4A is a graphical representation of the calculated far field profile of the fundamental guided mode in a microstructured optical fiber according to a preferred embodiment of the invention.
Figure 4B:
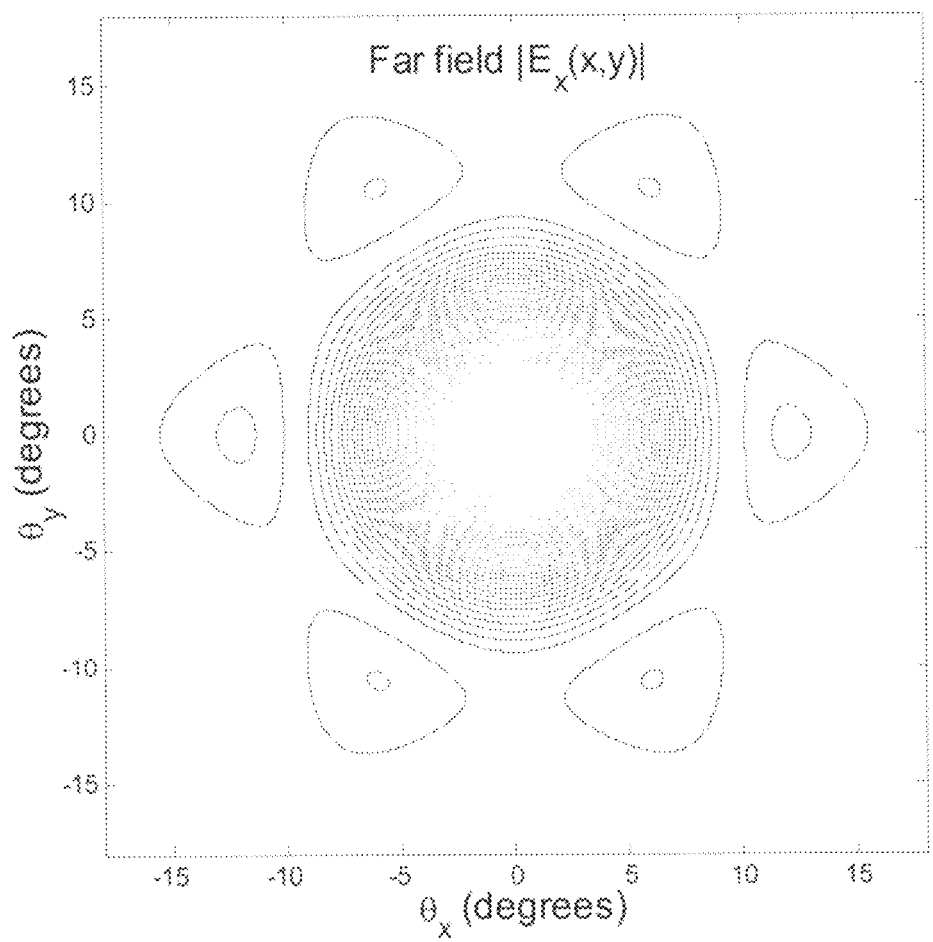
FIG. 4B [PRIOR ART] is a graphical representation of the calculated far field profile of the fundamental guided mode in a conventional microstructured optical fiber.

To demonstrate further the improvement in the quality of the guided mode profile, the far-field profiles of the modes are presented in FIGS. 4A and 4B. The far-field profile of the conventional TL-MOF (20A) presents some secondary lobes (FIG. 4B) which are not present in the far field profile associated with the AL-MOF (20) (FIG. 4A). Such secondary lobes are associated with sub-optimal beam quality and can be detrimental for applications where beam quality is critical, such as precision laser micromachining.

A passive AL-MOF made of a single bulk material in which the primary cladding consists of a plurality of low-index regions disposed in an Archimedean-like lattice defined by type A7 unit cells could be fabricated to have a large-mode-area (core diameter larger than 15 µm, ideally more than 25 µm) and be singlemode by a careful adjustment of the hole diameter. In that case, the fiber could be suitable for high power delivery.

Figure 5:
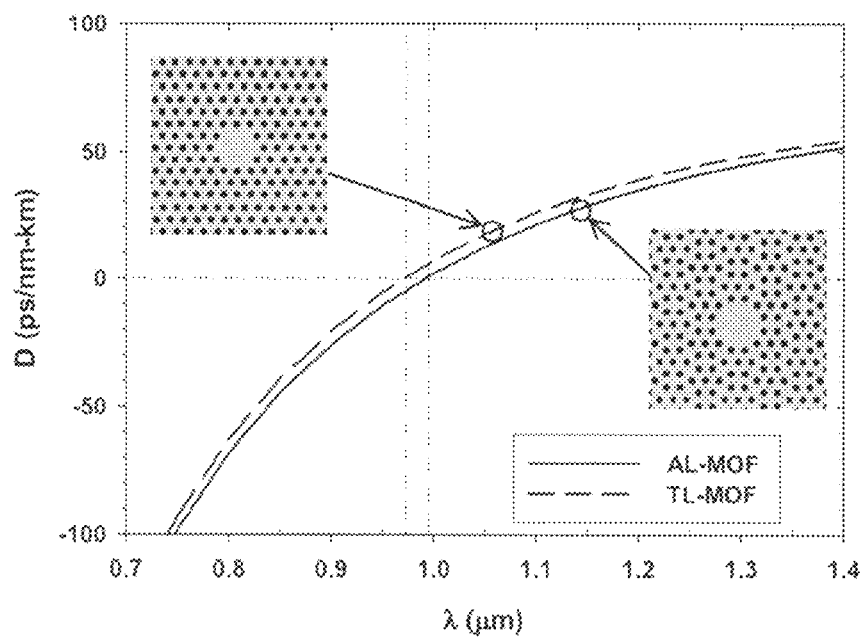
FIG. 5 is a graph presenting the calculated dispersion curves for a microstructured optical fiber according to a preferred embodiment of the invention and a conventional microstructured optical fiber according to prior art.

Alternatively, the dimensions of the guiding structure of an AL-MOF could be scaled down, which would reduce the effective area of the guided mode as well as reduce the zero-dispersion wavelength (ZDW) of the fiber below the material ZDW, which would make the fiber "highly nonlinear" around the ZDW and suitable for different nonlinear processes such as supercontinuum generation. FIG. 5 presents a graphical comparison between the calculated dispersion curves of a seven-missing-holes AL-MOF and a similar conventional TL-MOF having a pitch $\Lambda=1.3$ µm and a hole diameter to pitch ratio d/$\Lambda=0.5$. As it is quite clear on this graph, the dispersion properties of the AL-MOF and the TL-MOF are quite similar. Therefore, the benefit of the AL-MOF design proposed here resides in the enhancement of the circularity of the guided mode profile.

Quite possibly the most important application targeted by the AL-MOF design is the high-power fiber laser. As mentioned previously, using the AL-MOF design in a large mode area configuration can lead to a much better beam quality, especially in terms of beam circularity, as compared to a similar conventional TL-MOF. By adding active dopants in the core of an AL-MOF, it could be possible to take advantage of the improved beam quality offered by the AL-MOF in order to fabricate high-power fiber lasers or amplifiers as well as rod-type lasers or amplifiers.

In the case of such active fibers, it is often desirable to have a double-clad fiber design where this secondary cladding could be made of a low-index polymer or an air-cladding surrounding the Archimedean-like-lattice primary cladding. That way, the double-clad AL-MOF would have a profile similar to a double-clad conventional MOF, except that the inner microstructured cladding would form an Archimedean-like lattice.

Another possible application of the Archimedean-like lattice cladding structure would be to use it instead of a triangular lattice to form an air-guiding photonic bandgap fiber. In that particular case, the solid central core is removed and guidance is ensured by the creation of a photonic bandgap that prevents light from escaping the core. The design of the conventional "state-of-the-art" hollow-core photonic bandgap fiber consists of a TL microstructured cladding, while the AL microstructured cladding could also be used to form the cladding disposed around the central hollow core.

Method for Manufacturing a Microstructured Optical Fiber

In accordance with another aspect of the present invention, there is provided a method for making a microstructured optical fiber which includes the following steps.

(I) Fabricating a Fiber Preform

A microstructured optical fiber may be made by using a stack and draw process. The method of making the microstructured optical fiber is simplified by first fabricating a fiber preform. Fabricating the fiber preform preferably includes the following steps.

To define the light-guiding core of the microstructured optical fiber, a rod made of a transparent material—e.g. a polymer or glassy material such as silica—which may or may not be doped is provided. The core rod may have a uniform or varying refractive index. It may be solid across its entire cross-section or it may have holes along its circumferential perimeter, consistent with the circularized core of a microstructured optical fiber, as shown in FIGS. 10A and 12A. The holes may be vacant, filled with air or filled with an appropriate solid material capable of being drawn. A substep of filling any holes in the rod defining the light-guiding circularized core of the MOF (shown in FIGS. 10C and 12C) may also be included. The filling of the holes with a solid may be accomplished by inserting rods of the solid material of the appropriate dimension into the holes, inserting the material into the holes in liquid form and allowing the liquid to cool down to a solid, etc. Advantageously, if need be, unwanted air holes may be made to collapse during a later step of drawing, as it will be explained further below. Alternatively, for the case of a microstructured optical fiber with photonic-bandgap light guidance, the rod may have a hollow center.

Preferably and advantageously, the rod has a cross-section profile which is substantially circular or hexagonal, but of course may have any appropriate cross-section profile conducive to the fabrication of the fiber perform.

The fabrication of the fiber preform next includes fabricating a plurality of canes, each of the plurality of canes having a substantially hexagonal cross-section and being provided with a number of holes arranged in a unit cell defining an Archimedean-like lattice. These canes are used to define the primary cladding surrounding the core of the microstructured optical fiber. A schematic representation of a length of one such cane (34) is given in FIG. 13A. Fabricating the plurality of canes needed may be accomplished preferably by one of the two techniques described below. Of course, it is to be understood that alternative cane fabrication techniques may be used and that the techniques described herein below are given for illustrative purposes.

One technique for fabricating the plurality of canes includes the following steps:

(i) providing a rod

In order to fabricate a cane, a rod made of appropriate cladding material is provided. The rod may be made of a transparent polymeric or glassy material, for example silica. The rod material may be the same as the rod material used to define the light-guiding core of the MOF.

(ii) drilling the required holes longitudinally through the rod and milling the rod to give the rod the substantially hexagonal cross-section Holes consistent with the unit cell defining the Archimedean-like lattice are drilled along the length of the rod. The drilling may be performed using an ultra-sonic drill having a diamond impregnated tip.

Preferably, the holes each have substantially the same diameter and are separated by substantially the same distance. In a preferred embodiment of the MOF, seven holes arranged in a centred hexagon are drilled in consistency with the A7-type unit cell shown in FIG. 2. For example, the diameter of the rod may be in the range of 20 to 40 mm (limited by the opening of the fiber oven) and that of the drilled holes may be of the order of a few millimeters.

Six flat sides are milled on the outer surface of the rod giving the rod the substantially hexagonal cross-section about the number of holes arranged according to the unit cell defining the Archimedean-like lattice. The milling is done using a milling machine having a diamond-impregnated tool.

It should be noted that it is possible to first mill the rod to give the rod its substantially hexagonal cross-section and to then drill the required holes longitudinally through the rod in accordance with the desired unit cell.

In the case where the holes of the final MOF will not be vacant or filled with a fluid, an additional step of filling the holes drilled in the rod with a solid transparent material capable of being drawn may be included. The filling of the holes with a solid may be accomplished by inserting rods of the solid material of the appropriate dimension into the holes, inserting the material into the holes in liquid form and allowing the liquid to cool down to a solid, etc.

(iii) drawing the rod into an elongated cane

Once the holes have been drilled and the sides milled, the rod may then be drawn into an elongated cane by using a fiber drawing tower.

(iv) cutting the elongated cane to obtain one of the plurality of canes

As the rod is drawn into the elongated cane, the elongated cane is cut to length to fabricate one of the plurality of canes needed to fabricate the fiber preform of the MOF. The cutting is carried out using any number of methods (e.g., a glass scoring knife with a tungsten carbide blade, which is commonly found in a fiber drawing facility).

(v) repeating steps (iii) to (iv) to obtain the plurality of canes

The rod is continuously drawn into an elongated cane and canes are continuously and sequentially cut from the elongated cane thus obtaining the plurality of canes needed to fabricate the fiber preform. Of course, it is also possible to draw out a long piece of elongated cane and cut it into several shorter canes of the required length (i.e. into the plurality of canes).

If the number of canes needed to fabricate the fiber preform of the MOF is great, it is preferable that the cane preform be sufficiently long and large so as to be able to obtain all of the canes from a single drawing and thus assure that all of the canes have relatively the same dimensions. If this is not possible, then it may be necessary to fabricate several cane preforms. Steps (i) to (v) above may be repeated as needed to obtain the canes required to fabricate the fiber preform of the MOF.

Another technique for fabricating the plurality of canes, which foregoes the need for drilling and milling, includes the following steps:

(i) fabricating a cane preform by stacking rods to form the number of holes arranged in a unit cell defining an Archimedean-like lattice Rods, substantially solid or hollow, made of appropriate material (i.e. made of a transparent polymeric or glassy material, for example, silica), may be used as the basic elements of the cane. In the case where the holes of the MOF consist of a solid material, use of substantially solid rods may be simplest. However, in the case where the holes of the MOF are vacant or filled with fluid, hollow rods (38) (e.g., capillary tubes or other appropriate hollow tubes) with walls made of the primary cladding material may be best, as shown in FIG. 13B. In any case, these "hole" rods are preferably arranged in a stack so as to fabricate a cane preform—the hole rods forming the required number of holes consistent with a unit cell of the desired Archimedean-like lattice. The actual stacking may be done manually or through some automated process which may be computer-guided. For ease of stacking, a ring or tie may be used to temporarily bundle the hole rods.

Optionally, solid filler rods may be assembled along with the hole rods when stacking the hole rods to fabricate the cane preform. The solid filler rods, of various appropriate dimensions and preferably made of the same transparent material as the primary cladding, are used to fill the spaces between the stacked hole rods. This not only helps to achieve the desired hexagonal form of the cane preform, but also has the benefit of increasing the mechanical strength of the cane.

The cane-preform fabrication method may include an additional step of overcladding the cane preform. The overcladding may be done by inserting the stack of hole rods and filler rods into a tube, preferably thin-walled, of suitable dimensions. Additional solid filler rods may be used to partially fill the remaining space between the stack of tubes and the overcladding of the preform. In the preferred embodiment of the cane preform (36) given in FIG. 13B, hollow "hole" rods (38) have been inserted into an overcladding tube (42) and filler rods (40) have been used to partially fill the spaces (44) between the hollow rods (38) and the overcladding tube (42).

(ii) drawing the cane preform into an elongated cane

The cane preform may be drawn into an elongated cane having a hexagonal cross-section and comprising a number of holes arranged in a unit cell defining an Archimedean-like lattice using a fiber drawing tower.

In the case where the hole rods used to form the cane preform are hollow, it is preferable to ensure that the holes formed by the hollow hole rods have a higher internal pressure than the rest of the preform during the drawing process so as to prevent the collapse of the holes. A person versed in the field is familiar with the drawing of such structures and would recognize that it may be preferable to use a vacuum system to evacuate the region around the hollow rods and maintain a pressure higher in the hollow rods than that in the evacuated region.

(iii) cutting the elongated cane to obtain one of the plurality of canes

As the cane preform is drawn into an elongated cane, the elongated cane is cut to length to fabricate one of the plurality of canes needed to fabricate the fiber preform of the MOF. The cutting is carried out using any number of methods (e.g., a glass scoring knife with a tungsten carbide blade, which is commonly found in a fiber drawing facility).

If an outer tube is to be used as overcladding, it may be preferable to etch the outer diameter of the resulting elongated cane in order to obtain the Archimedean-like lattice with a substantially constant pitch $\Lambda$ between all of the holes of the final MOF structure.

(iv) repeating steps (ii) to (iii) to obtain the plurality of canes

As with the previous cane-preform method, to obtain the plurality of canes needed to fabricate the fiber preform of the MOF, the elongated cane is preferably sequentially cut into several shorter canes of the required length (i.e. into the plurality of canes) during the drawing process.

Steps (i) to (iv) above may be repeated as needed to obtain all of the canes required to fabricate the fiber preform of the MOF.

Figure 2:
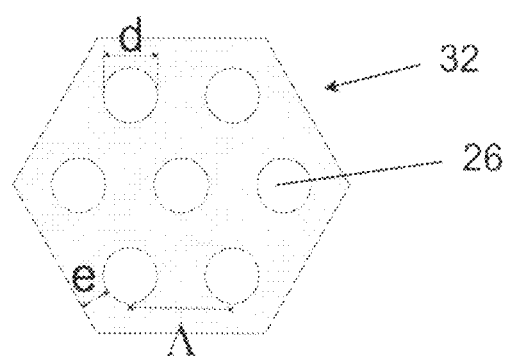
FIG. 2 is a schematic representation of an Archimedean-like lattice unit cell with seven holes, the so-called A7 unit cell according to a preferred embodiment of the invention.
Figure 13A:
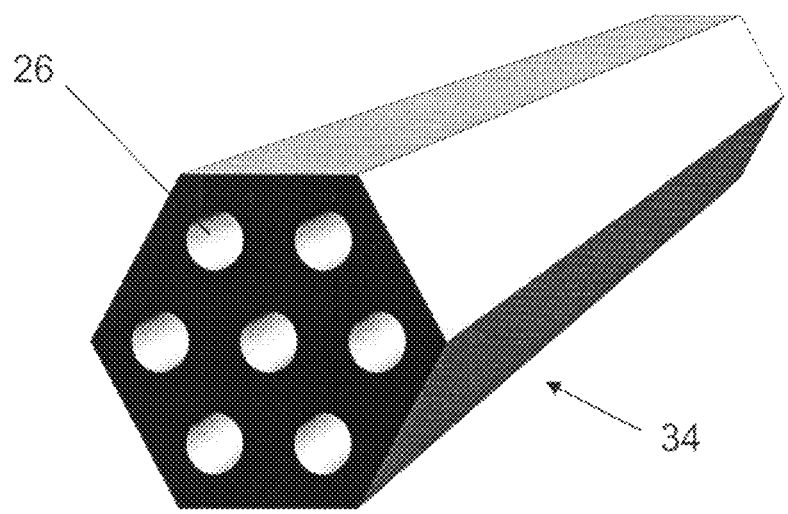
FIG. 13A is a schematic representation of a length of a cane used in the making of a microstructured optical fiber according to a preferred embodiment of the invention.
Figure 13B:
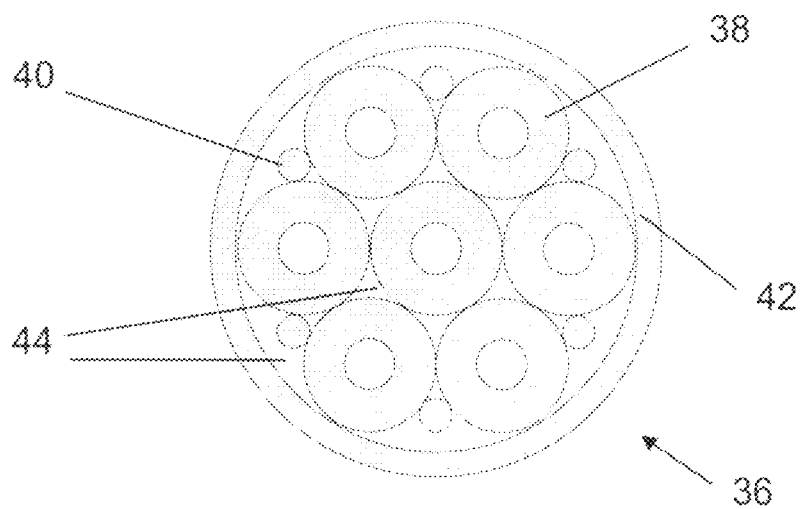
FIG. 13B is a schematic representation of a cross-section of an overcladded cane preform, according to one embodiment, showing the tubes and rods inserted into the overcladding tube.

In a preferred embodiment of the MOF, each of the canes (34) used to fabricate the fiber preform has seven holes (26) arranged in a centred hexagon, as shown in FIG. 13A and in consistency with the A7-type unit cell shown in FIG. 2. Preferably, the holes each have substantially the same diameter d and are separated by a distance $\Lambda$, and the perpendicular distance e from a hole along the perimeter of the hexagon to a flat side is preferably substantially equal to $0.5(\Lambda-d)$.

It is obvious from the above description that the meaning of the term "holes" is not limited to regions of absence—the term "holes" being used to denote specific regions having different optical properties than the surrounding material.

(c) Stacking the Plurality of Canes Concentrically Around the Rod

Figure 14:
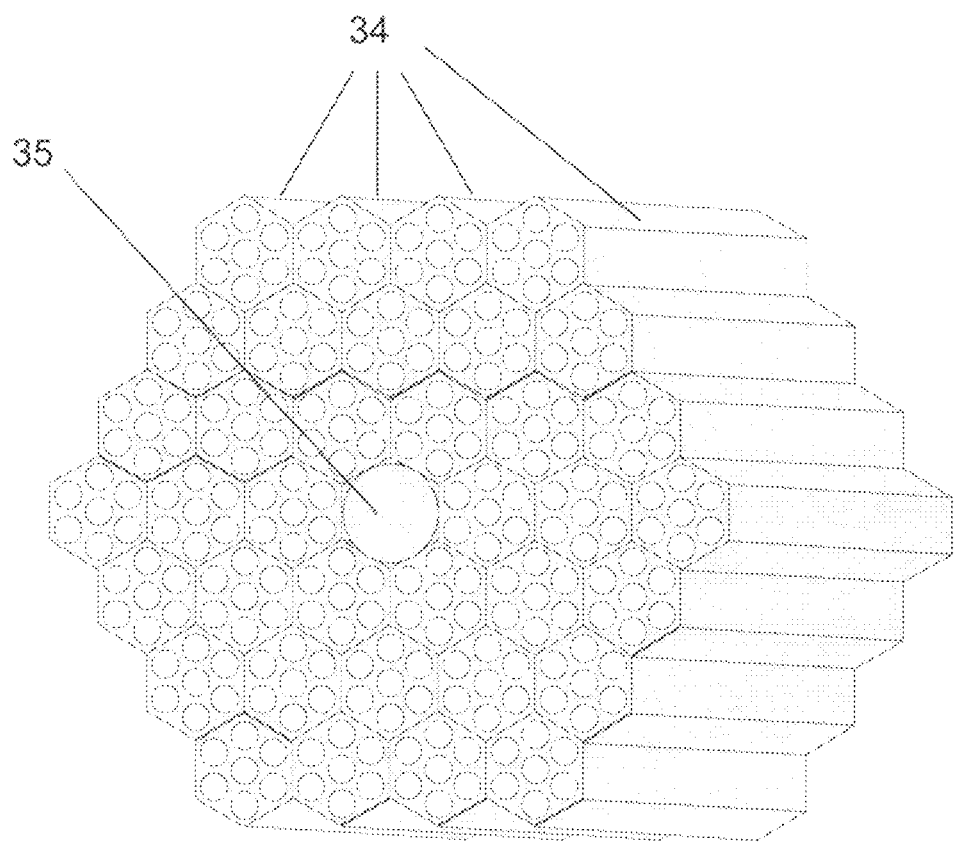
FIG. 14 is a schematic representation of a typical stacking of hexagonal elongated canes having an A7 unit cell profile that are part of a preform to be drawn into an Archimedean-like lattice microstructured optical fiber according to one embodiment of the invention.

Once the required number of canes has been fabricated, the next step is to stack the canes concentrically around the rod defining the light-guiding core. Preferably, at least one ring of canes is stacked around the core rod. Additional rings of canes may be stacked, in which case one or more of the outermost rings need not be complete. Advantageously, the hexagonal elongated shape of the canes lends itself to the stacking. The rod forming the core of the structure need not be hexagonal, although a rod of similar hexagonal cross-section dimensions as the canes would facilitate the stacking of the canes and fabrication of the preform. The actual stacking may be done manually or through some automated process which may be computer-guided. For ease of stacking, a ring, tie or other holding means may be used to temporarily bundle the tubes. FIG. 14 illustrates the concentric stacking of three rings of canes (34) around a solid cylindrical core rod (35) in accordance with a preferred embodiment of the invention.

Figures 15A, 15B, 15C, 15D:
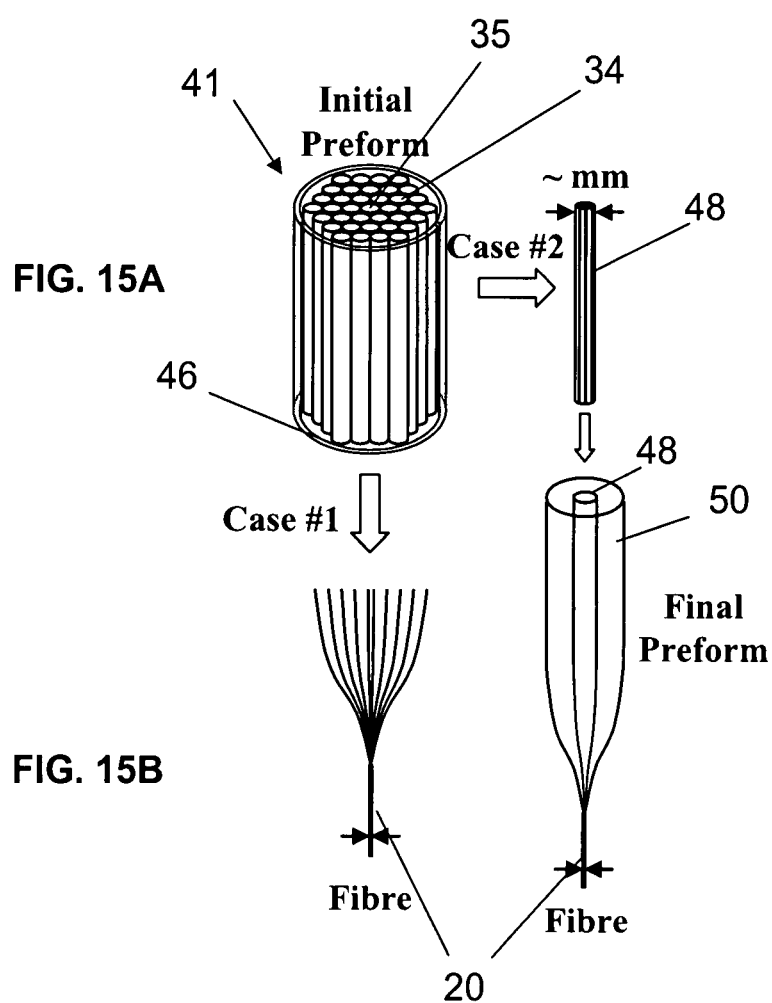
FIG. 15A is a schematic representation of an overcladded fiber preform according to a preferred embodiment.
FIG. 15B is a schematic representation of the fiber preform shown in FIG. 15A being drawn into a final microstructured optical fiber, in accordance with one embodiment of the invention.
FIG. 15C is a schematic representation of the fiber preform of FIG. 15A after it has been drawn into an intermediate fiber, in accordance with one embodiment of the invention.
FIG. 15D is a schematic representation of the intermediate fiber of FIG. 15C (which has been overcladded) being drawn into a final microstructured optical fiber, in accordance with one embodiment of the invention.

Following the step of stacking, it may be preferable to include an additional step of overcladding the fiber preform (41), as shown in FIG. 15A. The overcladding may consist of inserting the canes (34) and core rod (35) of the fiber preform (41) into a tube (46) of suitable dimensions and material. Overcladding the fiber preform has the added benefit of adding additional material to the fiber preform and thus increasing the mechanical strength of the resulting MOF. To avoid unwanted interstitial space in the resulting MOF, solid rods of appropriate dimensions and material may be inserted accordingly into the spaces between the fiber preform and the overcladding tube.

Depending on the desired dimensions of the resulting MOF, the fiber preform (41) may either be directly drawn into a fiber (20) having the desired dimensions (FIG. 15B) or be drawn into an intermediate fiber (48) of a diameter smaller than the fiber preform but larger than the final MOF, for example into an intermediate fiber of an external diameter of the order of a millimeter (e.g., 1 to 6 mm depending on the design) (FIG. 15C). This intermediate fiber is then overcladded with a tube (50) to form the final fiber preform to be drawn into the final MOF (20) (FIG. 15D). In either case, the holes inside the canes constituting the microstructured cladding, as well as any holes in the rod constituting the light-guiding core, preferably have a higher internal pressure than the rest of the fiber preform during the drawing to avoid a collapse of the holes and any unwanted interstitial spaces in the final MOF. As with conventional fibers, a protective coating of acrylate is applied on the final MOF fiber during the drawing process.

Figure 16A:
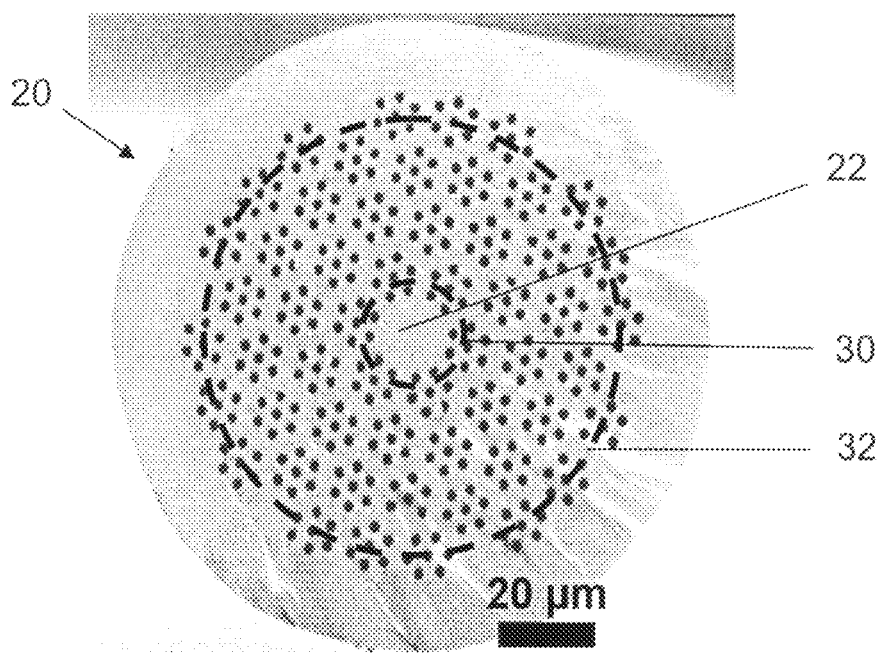
FIG. 16A is a scanning electron microscope image of a cross-section of a pure silica microstructured optical fiber according to a preferred embodiment of the invention.
Figure 16B:
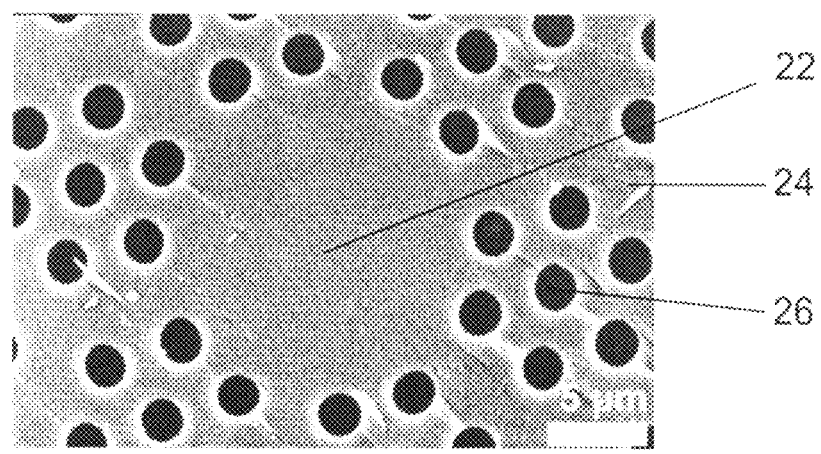
FIG. 16B is a magnification of a portion of the cross-section shown in FIG. 16A.

As mentioned earlier, according to one embodiment of the invention, the rod provided to define the core may have a number of holes arranged in a unit cell of an Archimedean-like lattice (e.g. the rod may be just another one of the canes constituting the primary cladding). Some or all of the holes within the core rod may be made to collapse during the drawing process to thereby form a substantially solid core in the resulting MOF by ensuring that the holes of the core rod have a sufficiently lower internal pressure than the holes of the surrounding canes. An example of an Archimedean-like lattice microstructured optical fiber (20) with a solid core (22) is shown in FIGS. 16A and 16B. In this example, the hole diameter d is of the order of 2 µm and the hole separation (i.e. pitch) $\Lambda$ is of the order of 4 µm.

The method of making a MOF may further include a step after the drawing process of evacuating the holes or filling the holes with a material of different refractive index than the primary cladding. The holes may be filled with a fluid such as a gas (e.g. air, hydrogen, etc.) or a liquid (water, solutions of dyes, etc.) or with a solid material (e.g. a polymer, a glass, etc.). The filling of the holes with a fluid may be accomplished using a number of methods: capillary action, suction, a pump, injection with a syringe, etc. The filling of the holes with a solid material may basically be carried out in the same manner as the filling of the holes in the primary cladding canes.

Numerous modifications could be made to any of the embodiments described above without departing from the scope of the present invention as defined in the appended claims.

The invention claimed is:

1. A microstructured optical fiber, comprising:
   a light-guiding core; and
   a primary cladding surrounding said core, wherein said primary cladding comprises a plurality of holes extending parallelly to said light-guiding core, arranged in hexagonal unit cells and defining an Archimedean-like lattice transverse to said light-guiding core, each of said holes being fully enclosed within one of said hexagonal unit cells.

2. The microstructured optical fiber according to claim 1, wherein said core is defined by a break in a center of said Archimedean-like lattice, said break being characterised by an absence of at least one of said unit cells.

3. The microstructured optical fiber according to claim 1, wherein said Archimedean-like lattice comprises at least one complete ring of said unit cells arranged circumferentially around said core.

4. The microstructured optical fiber according to claim 3, wherein said Archimedean-like lattice comprises one incomplete outer ring of said unit cells arranged circumferentially around said at least one complete ring.

5. The microstructured optical fiber according to claim 1, wherein each of said unit cells comprise seven of said holes arranged in a centred hexagon.

6. The microstructured optical fiber according to claim 1, wherein each of said unit cells comprises six of said holes of said plurality of holes arranged in a hexagon.

7. The microstructured fiber according to claim 1, wherein each of said unit cells comprises nineteen of said holes.

8. The microstructured optical fiber according to claim 1, wherein each of said unit cells comprises eighteen of said holes.

9. The microstructured optical fiber according to claim 1, wherein said core is substantially solid.

10. The microstructured optical fiber according to claim 1, wherein said core is made of a vacuum or air.

11. The microstructured optical fiber according to claim 1, wherein said holes are substantially circular in shape.

12. The microstructured optical fiber according to claim 1, wherein said holes have a refractive index which is less than a refractive index of the primary cladding.

13. The microstructured optical fiber according to claim 1, wherein said holes are defined by vacuum or air.

14. The microstructured optical fiber according to claim 1, wherein said optical fiber further comprises an overcladding surrounding the primary cladding.

15. A method for making a microstructured optical fiber comprising the step of:
   (I) fabricating a fiber preform comprising the steps of:
      (a) providing a rod for defining a light-guiding core;
      (b) fabricating a plurality of canes, each of said plurality of canes having a substantially hexagonal cross-section and comprising a number of holes arranged in a unit cell and defining an Archimedean-like lattice, each of said holes being fully enclosed within said unit cell; and
      (c) stacking said plurality of canes concentrically around said rod.

16. The method according to claim 15, wherein said fabricating a plurality of canes of step (I)(b) comprises the substeps of:
   (i) providing a rod;
   (ii) drilling said number of holes longitudinally through said rod and milling said rod to give said rod the hexagonal cross-section;
   (iii) drawing said rod into an elongated cane;
   (iv) cutting said elongated cane to obtain one of said plurality of canes; and
   (v) repeating steps (iii) to (iv) to obtain said plurality of canes.

17. The method according to claim 15, wherein said fabricating a plurality of canes of step (I)(b) comprises the substeps of:
   (i) fabricating a cane preform by stacking rods to form said number of holes arranged in a unit cell and defining an Archimedean-like lattice;
   (ii) drawing said cane preform into an elongated cane;
   (iii) cutting said elongated cane to obtain one of said plurality of canes; and
   (iv) repeating steps (ii) to (iii) to obtain said plurality of canes.

18. The method according to claim 17, wherein said stacking rods of step (I)(b)(i) comprises assembling rods and solid filler rods.

19. The method according to claim 18, comprising an additional step before step (ii) of overcladding said cane preform.

20. The method according to claim 19, comprising an additional step of etching said elongated cane.

21. The method according to claim 15, wherein said fabricating a plurality of canes of step (I)(b) comprises a substep of filling said holes with a solid material capable of being drawn.

22. The method according to claim 15, wherein said fabricating a fiber preform further comprises an additional step of overcladding said fiber preform.

23. The method according to claim 22, further comprising an additional step, after said step of overcladding, of partially filling spaces by inserting solid filler rods.

24. The method according to claim 15, further comprising an additional step (II) of drawing said fiber preform into said microstructured optical fiber.

25. The method according to claim 24, wherein said rod of step (I)(a) has a substantially hexagonal cross-section and comprises a number of holes arranged in said unit cell and defining said Archimedean-like lattice, each of said holes being fully enclosed within one of said hexagonal unit cells, and wherein step (II) comprises a substep of regulating pressure in said number of holes of said rod during said drawing to collapse said number of holes of said rod and create a solid core in said microstructured optical fiber.

* * * * *